United States Patent [19]

Spamer et al.

[11] Patent Number: 5,634,564
[45] Date of Patent: Jun. 3, 1997

[54] PUSHER DEVICE FOR DISPENSING ARTICLES

[75] Inventors: William S. Spamer, Roswell; Dennis E. Parham, Kennesaw; Timothy M. Shannon, Marietta, all of Ga.

[73] Assignee: The Mead Corporation, Dayton, Ohio

[21] Appl. No.: 489,972

[22] Filed: Jun. 13, 1995

[51] Int. Cl.⁶ .................................. A47F 1/04; A47F 7/00
[52] U.S. Cl. .......................... 211/59.3; 211/175; 312/71
[58] Field of Search ............................ 211/59.3, 59.2, 211/175, 184; 312/42, 71; D6/408

[56] References Cited

U.S. PATENT DOCUMENTS

| | | | |
|---|---|---|---|
| D. 330,121 | 10/1992 | Wear et al. | D6/408 |
| 3,028,014 | 4/1962 | Southwick | 211/59.3 |
| 3,083,067 | 3/1963 | Vos et al. | 312/71 |
| 3,161,295 | 12/1964 | Chesley | 211/59.3 X |
| 3,166,195 | 1/1965 | Taber | 211/59.4 |
| 3,308,961 | 3/1967 | Chesley | 211/59.3 |
| 3,426,115 | 2/1969 | Taber | 264/160 |
| 3,848,745 | 11/1974 | Smith | 211/59.3 |
| 4,300,693 | 11/1981 | Spamer | 211/59.3 |
| 4,303,162 | 12/1981 | Suttles | 211/59.3 |
| 4,454,949 | 6/1984 | Flum | 211/59.2 |
| 4,470,943 | 9/1984 | Preis | 264/162 |
| 4,565,725 | 1/1986 | Spamer et al. | 428/167 |
| 4,729,481 | 3/1988 | Hawkinson et al. | 211/59.3 |
| 4,730,741 | 3/1988 | Jackle, III | 211/59.3 |
| 4,742,936 | 5/1988 | Rein | 312/71 X |
| 4,762,236 | 8/1988 | Jackle, III et al. | 211/59.3 |
| 4,830,201 | 5/1989 | Breslow | 211/184 |
| 4,898,282 | 2/1990 | Hawkinson et al. | 211/49.1 |
| 4,899,893 | 2/1990 | Robertson | 211/59.3 |
| 4,901,869 | 2/1990 | Hawkinson et al. | 211/59.3 |
| 4,997,094 | 3/1991 | Spamer et al. | 211/153 |
| 5,012,936 | 5/1991 | Crum | 211/59.3 |
| 5,027,957 | 7/1991 | Skalski | 211/59.3 |
| 5,069,349 | 12/1991 | Wear et al. | 211/59.3 |
| 5,111,942 | 5/1992 | Bernardin | 211/59.3 |
| 5,123,546 | 6/1992 | Crum | 211/59.3 |
| 5,240,126 | 8/1993 | Foster et al. | 312/71 X |
| 5,366,099 | 11/1994 | Schmid | 211/175 X |

OTHER PUBLICATIONS

Copies of seven instant snapshots of a device as displayed in Harry's Farmers Market in Duluth, Georgia in Mar. 1995.

*Primary Examiner*—Ramon O. Ramirez
*Assistant Examiner*—Sandra Snapp
*Attorney, Agent, or Firm*—Tsugihiko Suzuki

[57] ABSTRACT

A pusher device for dispensing merchandise is disclosed. The device includes an elongate plastic track having a floor on which a row of articles are positioned for movement therealong, a pusher connected to the track for movement therealong and having a front side for engagement with the rearmost article on the track, and a spring for urging the pusher toward the front end of the track to forwardly move all the articles on the track. The spring is a gradient force, self-coiling spring arranged to exert forwardly directed force on the rear side of the pusher. The force on the pusher gradually reduces as the leading articles on the track successively are removed from the track, and thereby articles on the track are prevented from being subject to excessive force. What is also disclosed is a pusher device including an elongate track, a pusher movably connected to the track, and a self-coiling spring for urging the pusher forward of the track. The spring is formed of a strip of spring material wound at least partially to form a coiled portion that is arranged such that the coiled portion is extended as the pusher is moved backward. The coiled portion, when fully wound, includes an inner set of layers of the strip and an outer set of layers of the strip disposed around the inner set of layers. The inner set of layers forms a constant force spring whereas the outer set of layers forms a gradient force spring. What is further disclosed is a pusher device which includes an elongate track, a pusher movably connected to the track, a spring for urging the pusher forward, and a mooring mechanism for locking the pusher in the rearmost position on the track so as to facilitate loading of articles onto the track. The locking mechanism is provided on the pusher to engage a rear wall upstanding on the track.

12 Claims, 9 Drawing Sheets

PUSHER DEVICE FOR DISPENSING ARTICLES

BACKGROUND OF THE INVENTION

The present invention relates generally to article display devices useful in merchandising articles such as bottled, canned or packaged food or drink products and, more particularly, to a spring-driven pusher device for use on a display shelf to dispense articles one by one from the front of the shelf.

U.S. Pat. No. 4,303,162 to Suttles, issued Dec. 1, 1981 and owned by the assignee of the present invention, describes a forward feed merchandising device using a positive gradient spring to dispense articles one by one from the front end of a metal track that is supported on a shelf.

U.S. Pat. No. 4,300,693 to Spamer, issued Nov. 17, 1981 and owned by the assignee of the present invention, discloses a merchandise feed device wherein a plastic track is used with constant ratio springs.

U.S. Pat. No. 3,161,295 to Chesley, issued Dec. 15, 1964, discloses a merchandise display device having a spring-driven pusher plate which can be locked in a position near the rear end of the track by means of a wire element having hook portions at its opposite ends.

SUMMARY OF THE INVENTION

According to the present invention in one form, an article pusher device is provided which comprises an elongate plastic track having a floor on which a row of articles are positioned for movement therealong, a pusher connected to the track for movement therealong and having a front side for engagement with the rearmost article on the track, and spring means for urging the pusher toward the front end of the track to move all the articles on the track forwardly. The spring means comprises a gradient force, self-coiling spring arranged to exert forwardly directed force on the rear side of the pusher, which force gradually reduces as the leading articles on the track successively are removed from the track. By this arrangement, the force exerted on the pusher can be such that when the device is fully loaded, the force is adequate to move all the articles on the track while as the number of the articles is decreased, it is reduced to the magnitude which is only enough to move the remaining articles. Accordingly, the articles on the track are prevented from being subject to excessive force which may cause ejection of the articles from the device or calamitous impact on the articles.

The gradient force spring used in the invention may be characterized by having a series of coil layers radially spaced from each other. The spring may comprise a strip of spring material such as metal, plastic, wood or even paper.

The present invention in another form provides a pusher device comprising an elongate track, a pusher connected to the track for movement along the track, and a self-coiling spring for urging the pusher forward of the track. The spring comprises a strip of spring material wound at least partially to form a coiled portion that is arranged such that the coiled portion is extended as the pusher is moved toward the rear end of the track. The coiled portion, when fully wound, comprises an inner set of layers of the strip disposed around the coil axis and an outer set of layers of the strip disposed around the inner set of layers. The layers in the inner set are arranged such that the inner set of layers forms a constant force spring whereas the layers in the outer set are arranged such that the outer set of layers forms a gradient force spring.

The present invention in a further form provides a pusher device which comprises an elongate track, a pusher connected to the track for movement along the length of the track, spring means for urging the pusher forward of the track, and mooring means for locking the pusher in a position adjacent to the rear end of the track. The mooring means is provided on the pusher to engage a rear wall which is upstanding from the floor of the track. This arrangement allows the pusher to be held at the rearmost position without using one hand while articles are being loaded onto the portion of the track between the pusher and the front end of the track, thereby facilitating the loading process.

The present invention also discloses an arrangement for interconnecting first and second objects disposed next to each other. The arrangement comprises a connector element and an anchoring element which are formed on the first object and a connector aperture and an anchoring aperture defined in the second object. The connector element has a main portion projecting from the first object to a free end and an engaging portion extending from the free end of the main portion along a horizontal notional line. The anchoring element is disposed at a position along the notional line and at a distance from the connector element, and it projects from such a position in the direction generally parallel to the main portion of the connector element. The anchoring aperture is disposed at a distance from the connector aperture generally equal to the distance between the connector and anchoring elements. The connector element is received in the connector aperture and disposed at an engaged position where the connector element engages the periphery of the connector aperture. Within the connector aperture, the connector element is movable along the notional line between the engaged position and a disengaged position where the connector element is disengaged from the periphery of the connector aperture. The anchoring element is received in the anchoring aperture and disposed at a retaining position where the anchoring element retains the connector element in the engaged position. Within the anchoring aperture, the anchoring element is movable along the notional line between the retaining position and a releasing position where the anchoring element allows the connector element to be in the disengaged position. A flexible locking element is joined to the second object and disposed in the anchoring aperture at a locking position where it takes over the releasing position of the anchoring element, thereby locking the anchoring element in the retaining position. The locking element is resiliently and vertically displaceable to the outside of the locking position.

The objects and advantages of the present invention will be apparent from the following description, the accompanying drawings and the appended claims.

DETAILED DESCRIPTION OF THE PREFERRED EMBODIMENT

Figure 1:
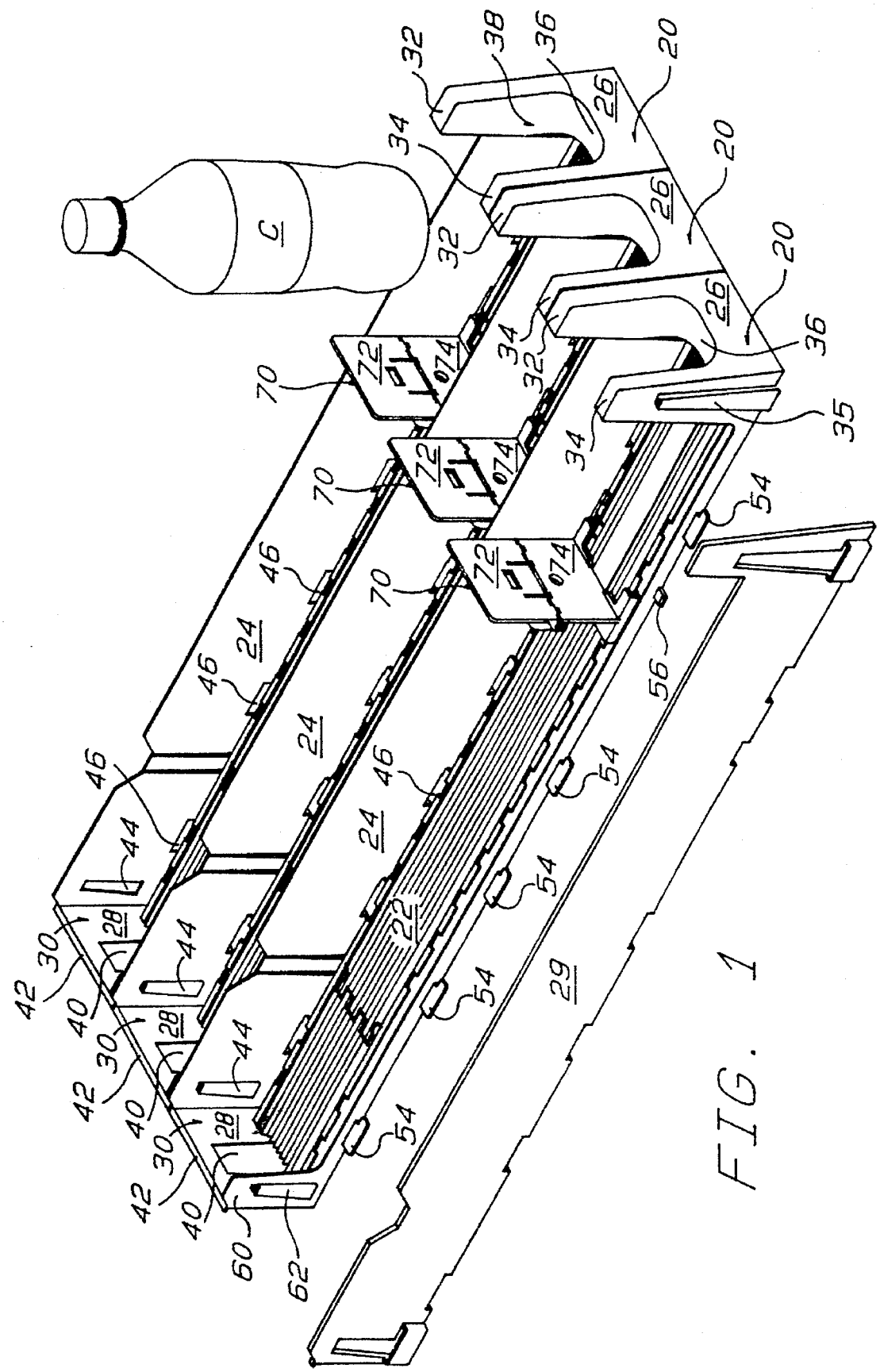
FIG. 1 is a perspective view of an article pusher device according to the present invention.
Figure 2:
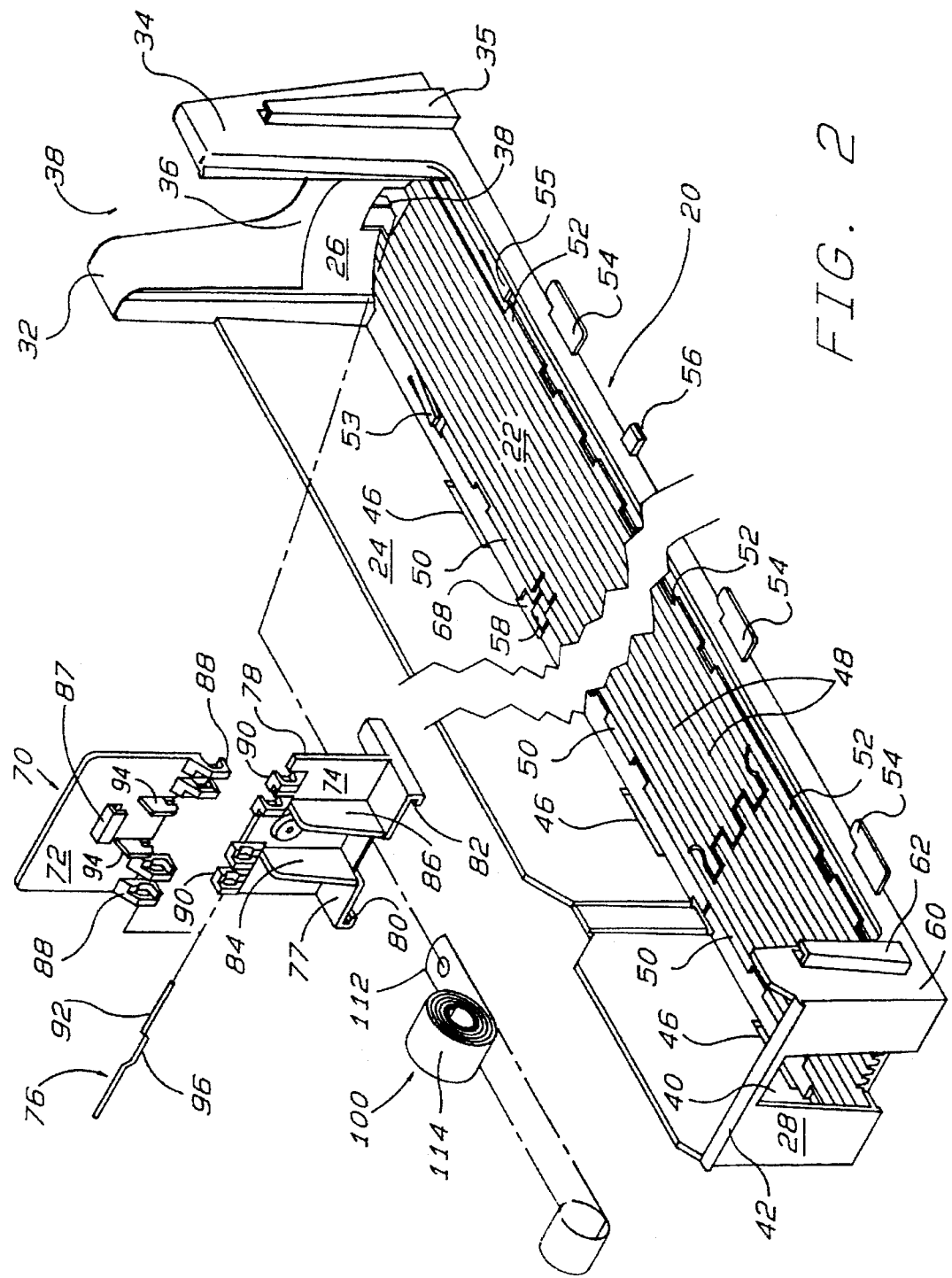
FIG. 2 is an exploded perspective view of a part of the device in FIG. 1, showing one of the tracks and the other parts associated therewith.

FIGS. 1 and 2 illustrates a spring-driven article pusher device according to the present invention, which is designed to merchandise articles C such as bottled, canned or packaged food or drink products. The device includes a plurality of detachably interconnected elongate, parallel tracks 20. A pusher or slider 70 is connected to each track 20 for sliding movement along the length of that tracks 20. A spring 100 (shown in FIG. 2) is incorporated into each track 20 so as to urge the respective pusher 70 forwardly of the track 20 toward the respective front wall 26.

The tracks 20 are interconnected in a side-by-side relationship in a manner such that the size of the entire device is suitable for placement onto an existing display shelf in a retail store in which the device is desired to be installed. The interconnection of two adjacent tracks are achieved by connecting means which will be described later in detail.

Each track is of a one-piece construction formed of molded plastic material and includes, as best illustrated in FIG. 2, an elongate floor 22, a side wall 24, and front and rear opposed walls 26 and 28. The side wall 24 is formed along one of the side edges of the floor 22 and extends upward from the floor 22. The front and rear walls 26 and 28 are formed at the front and rear opposite ends of the floor 22 and extend upward from the floor 22. The floor 22 and the side wall 24 of each track 20 and the side wall 24 of the adjacent track 20, in cooperation, define a channel 30 for receiving a row of articles C. The opposite ends of each channel 30 are defined by the respective front and rear walls 26 and 28. Reference numeral 29 in FIG. 1 denotes a side wall member for an endmost track 20', which is detachably connected to the endmost track 20' by utilizing the connector elements 35, 54 and 62 on the endmost track 20'.

The front wall 26 of each track 20 includes a pair of spaced article stopper posts 32 and 34 upstanding from the floor 22 and a sill 36 connecting between the lower portions of the posts 32 and 34. A cutout 37 is defined above the sill 36 and between the posts 32 and 34 to permit the leading/foremost article C in the respective channel 30 to be well visible from the consumers' view points. The post 32 has a vertical connector slot 33 (best shown in FIG. 3) formed along the outer side surface thereof whereas the post 34 has a vertical connector element 35 of a L-shaped horizontal cross section, which element 35 extends along the outer side surface of the post 34. Depending down from the sill 36 is an integral anchor stud 38 for the respective spring 100.

The rear wall 28 of each track 20 includes an opening 40 formed therein at the mid portion thereof and a retaining means in the form of a rib 42 extending horizontally along the top edge of the rear side of the wall 28. The opening 40 is useful to accommodate a coiled portion of the respective spring 100 when the minimum diameter of the spring 100 is relatively large.

The side wall 24 of each track 20 includes a vertical connector slot 44 (shown in FIG. 1) formed adjacent to the rear end thereof and a plurality of horizontal connector slots 46 disposed at spacings along the lower edge thereof.

A partial side wall 60 is extending forward a short distance from the rear wall 28 along the free side edge of the floor 22, and it is provided at the position opposing the connector slot 44 with a vertical connector element 62 of a L-shaped horizontal cross section.

Figure 5:
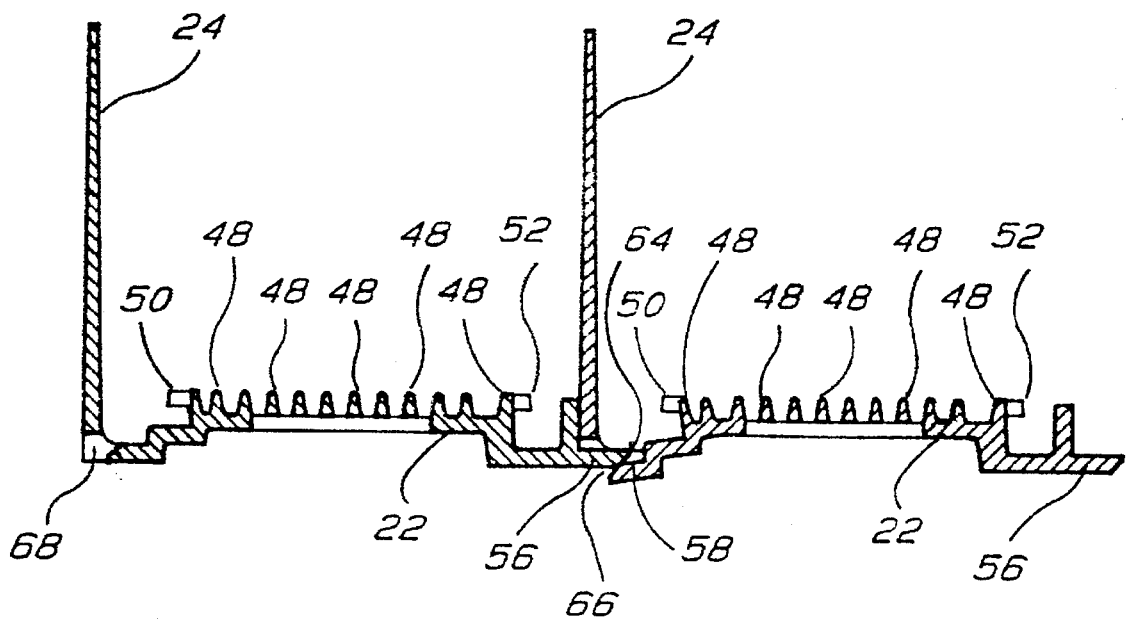
FIG. 5 is a view taken along the line V—V in FIG. 4.
Figure 7:
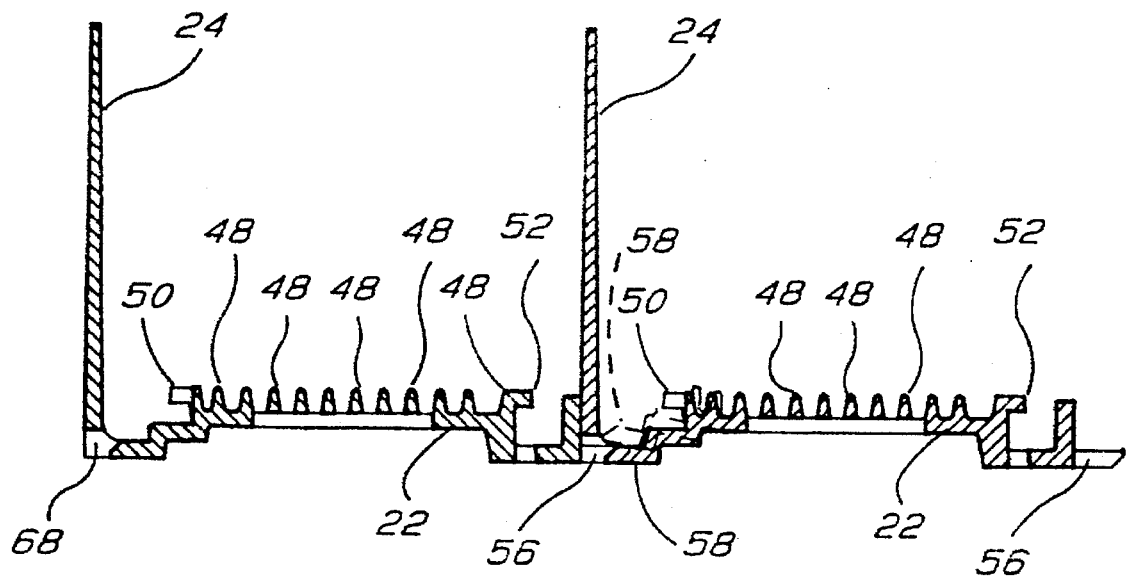
FIG. 7 is a view taken along the line VII—VII in FIG. 6.

The floor 22 of each track 20 has a plurality of parallel support ribs 48 as best shown in FIGS. 5 and 7. The ribs 48 extend between the front and rear walls 26 and 28. These ribs 48 are adapted to be in direct contact with the bottoms of the articles C on the track 20 and to thereby reduce the friction between the floor 22 and the articles C. The opposite endmost ribs 48 of each track 20 are provided at the tops thereof with outwardly directed flanges 50 and 52 which extend discontinuously along the respective endmost ribs 48. These flanges 50 and 52 form a pair of rails for engaging the respective pusher 70. A pair of depressible stopper tabs 53 and 55 (best shown in FIG. 2) are also provided on the floor 22 near the forward ends of the rails 50 and 52 to prevent the pusher 70 from forwardly passing thereover and coming off of the rails 50 and 52.

Figure 3:
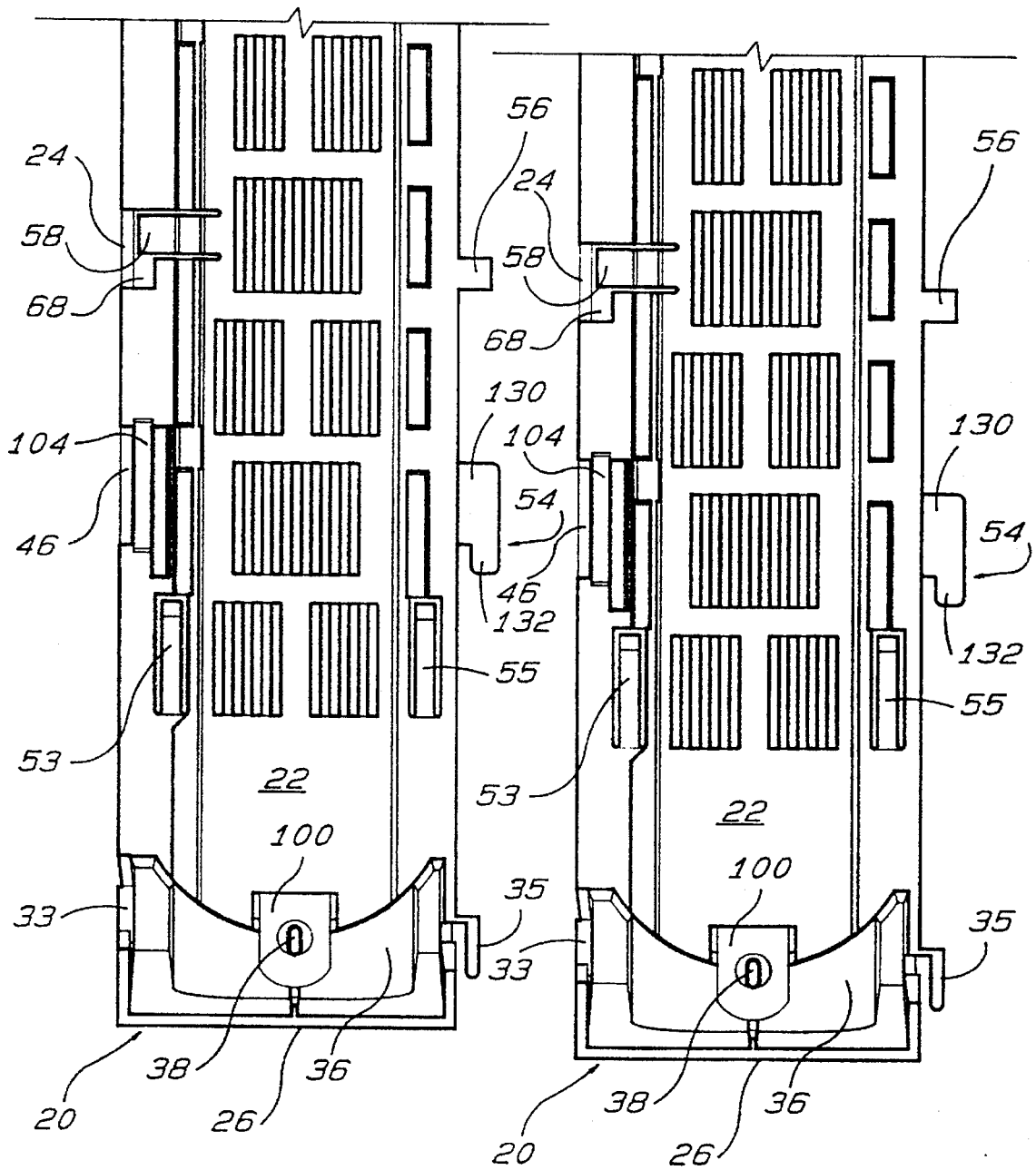
FIG. 3 is a bottom view showing two tracks being disposed side by side to be prepared for interconnection.

The floor 22 is further provided with a plurality of L-shaped horizontal connector tabs/elements 54 disposed at spacings along the free side edge of the floor 22. Each connector element 54 includes a main portion 130 (shown in FIG. 3) extending from the floor 22 transversely of the track 20 and an engaging portion 132 extending from the main portion 130 along the length of the track 20. These connector elements 54 are generally aligned transversely with the connector slots/apertures 46 and constitute, in cooperation with the aforementioned connector elements 35 and 62 and slots 33, 44 and 46, the connecting means to interconnect the respective track 20 with adjacent tracks of a similar structure. The floor 22 is also provided on the free edge thereof with an anchoring tab/element 56 and at the position across the floor 22 from the anchoring tab 56 with a flexible locking tab/element 58. As best shown in FIG. 5, the anchoring tab 56 has a bevelled free end surface 64 extending outwardly and upwardly. The locking tab 58 is joined at its proximal end to one of the endmost ribs 48 and project outwardly to a free end surface 66 which slopes outwardly and downwardly. As best shown in FIGS. 2 and 3, the locking tab 58, normally, is disposed within the transversely disposed portion of an L-shaped anchoring aperture 68 in the floor 22. The longitudinally disposed portion of the aperture 68 extends slightly into the side wall 24 as shown in FIG. 2, so as to permit access to the tab 58 from the side of the respective track 20.

In a preferred embodiment, the above tracks 20 are molded of a low friction plastic material containing high impact polystyrene and an organopolysiloxane such as dimethylpolysiloxane. Such low friction material can be prepared for example by mixing from 75.0 to 99.9 percent by weight of high impact polystyrene with 0.1 to 25.0 percent by weight of organopolysiloxane fluid. The mixture can be extruded into the tracks of a desired shape. Details of the track-forming process may be found by reference to U.S. Pat. No. 4,470,970 owned by the assignee of the invention, which is incorporated herein by reference.

Figure 4:
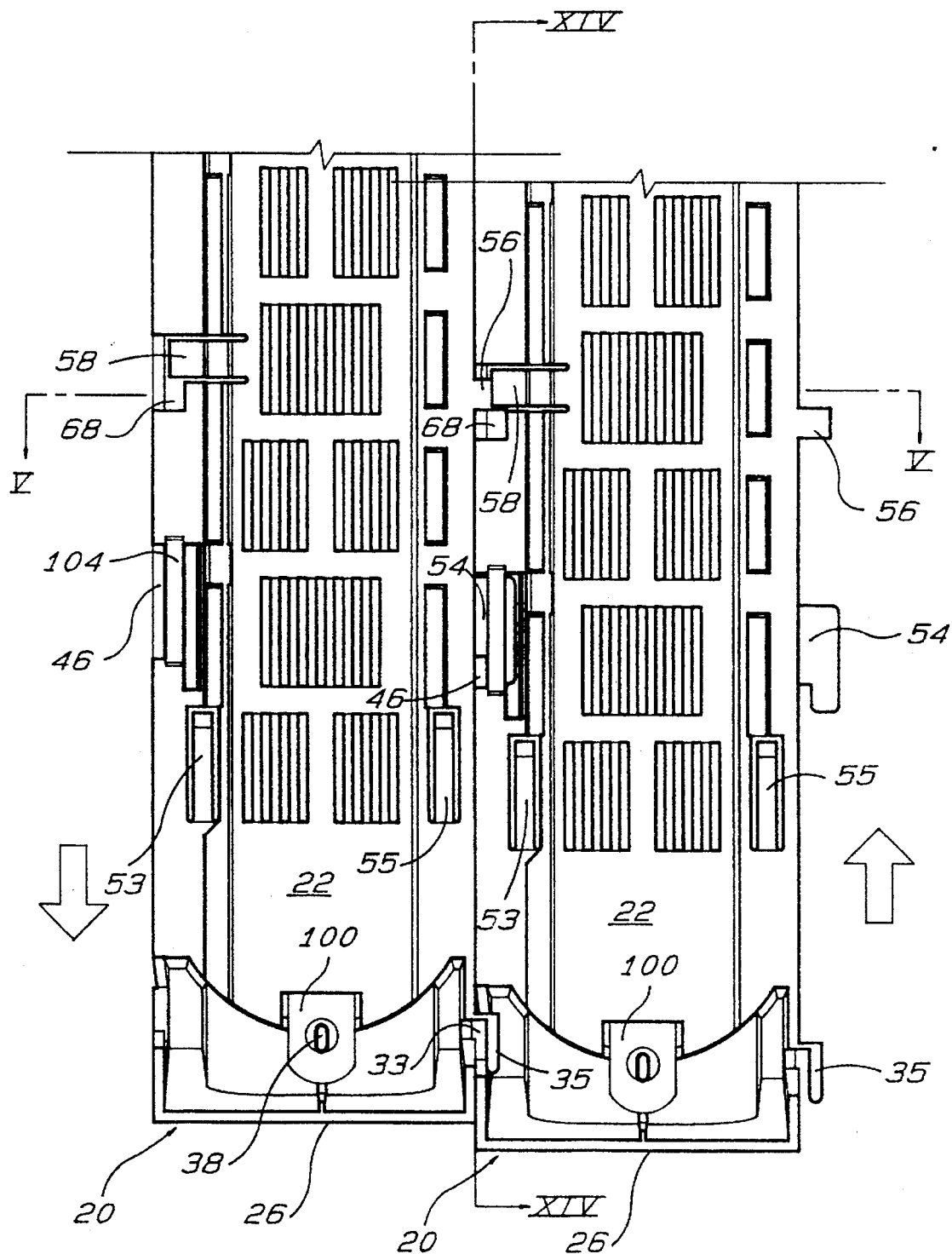
FIG. 4 is a bottom view showing the two tracks in FIG. 3 in the process of interconnection.
Figure 6:
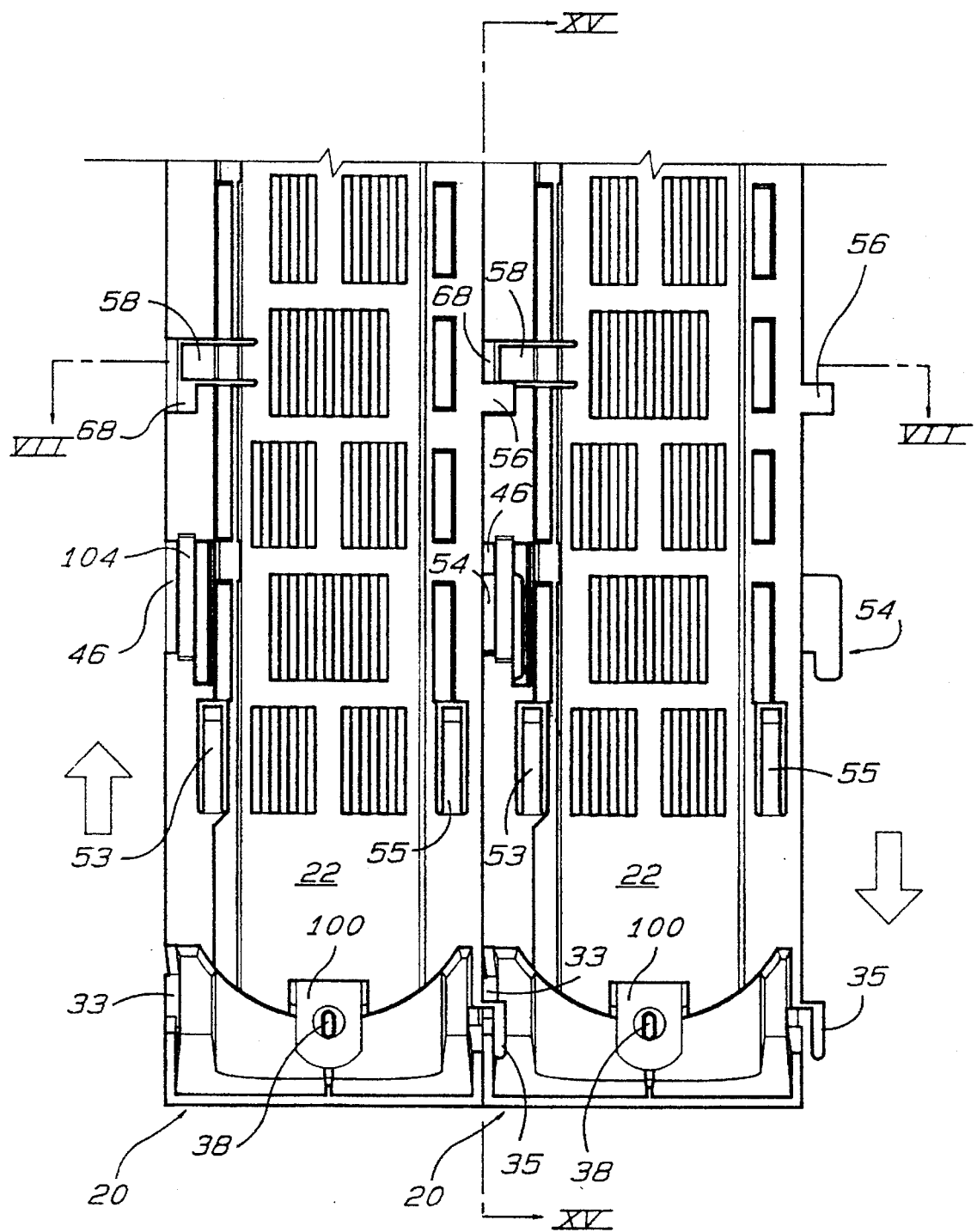
FIG. 6 is a bottom view showing the two tracks in FIG. 3 in a fully interconnected condition.

To interconnect two tracks 20 and 20' for example, the tracks are placed side by side as shown in FIG. 3, and then as shown in FIG. 4, the connector elements 35 and 54 of the track 20 are inserted into the connector slots 33 and 46 of the track 20', respectively. The element 62 of the track 20 is also inserted into the slot 44 of the track 20' although not shown in FIG. 4. By this means, the anchoring tab 56 of the track 20 is automatically inserted into the aperture 68 of the track 20' and is brought into abutment at the bevelled surface 64 against the sloping surface 66 of the locking tab 58 of the track 20'. Then, as shown in FIG. 5, the locking tab 58 is thrust downwardly aside by the anchoring tab 56, and thereby the anchoring tab 56 is allowed to fully enter the aperture 68. After that, the tracks 20 and 20' are moved in the opposite directions as indicated by the arrows in FIG. 4. This results in the interconnected condition shown in FIG. 6 in which the connector elements 35 and 54 of the track 20 are in engagement with the respective peripheries of the connector slots 33 and 46 of the other track 20'. The element 62 of the track 20 is also engaged with the periphery of the slot 44 of the track 20' although not shown in FIG. 6.

In the interconnected condition, the anchoring tab 56 of the track 20 has been moved longitudinally of the tracks to the longitudinally disposed portion of the aperture 68, i.e., the position where it does not interfere with the locking tab 58 of the track 20'. This allows the locking tab 58 to move resiliently back to the unthrust or normal position as shown in FIG. 7 in which the locking tab 58 lies in the same plane as the anchoring tab 56, preventing the anchoring tab 56 from moving backward toward the rear wall 28 of the track 20'. This, in turn, locks the elements 35, 54 and 62 in their respective engaged positions and thereby the tracks 20 and 20' are retained in the interconnected condition.

To disconnect the tracks 20 and 20', the locking tab 58 is depressed upward or downward to allow backward movement of the anchoring tab 56. The upwardly depressed position of the locking tab 58 is shown by the phantom line in FIG. 7. After that, the tracks 20 and 20' are mutually moved in the opposite directions indicated by the arrows in FIG. 6 so that the connector elements 35, 54 and 62 of the track 20 are disengaged from the respective peripheries of the connector slots 33, 46 and 44 of the track 20'.

Returning to FIG. 2, each pusher 70 comprises two primary parts, i.e., an upper member 72 and a lower member 74, which are interconnected by a hinge 76. The lower member 74 includes a base portion 77 having a pair of opposed channels 80 and 82, and an upright plate portion 78 upstanding from the base portion 77. The channels 80 and 82 receive therein the rails 50 and 52 of the respective track 20 so as to allow the respective pusher 70 to slide along the length of the track 20. The lower member 74 also includes a spring retainer 84 and 86 joined to the rear surface of the plate portion 78 and extending backward therefrom. The upper member 72 is of a plate structure connected along its lower edge to the lower member 74 via the hinge 76 so as to be selectively pivotable forward and backward with respect to the lower member 74. The upper member 72 is provided on its rear surface with mooring means in the form of an integral hook 87 of a L-shaped cross section that is adapted to engage the retaining means or rib 42 on the rear side of the rear wall 28.

The hinge 76 is a mechanical hinge which is called often as "sloppy hinge". The hinge 76 includes upper slotted knuckles 88 integrally formed with the upper member 72 and arranged at spacings along the lower edge of the upper member 72, lower slotted knuckles 90 formed integrally with the lower member 74 and arranged at spacings along the upper edge of the plate portion 78, and a horizontal hinge pin 92 loosely passed through the knuckles 88 and 90. The knuckles 88 and 90 are formed respectively with vertically elongated slots which permit the pin 92 to move vertically along the length of the slots. The pin 92 may have a bend 96 in its mid portion to prevent dislodgement of the pin 92 from the knuckles 88 and 90.

Figure 8:
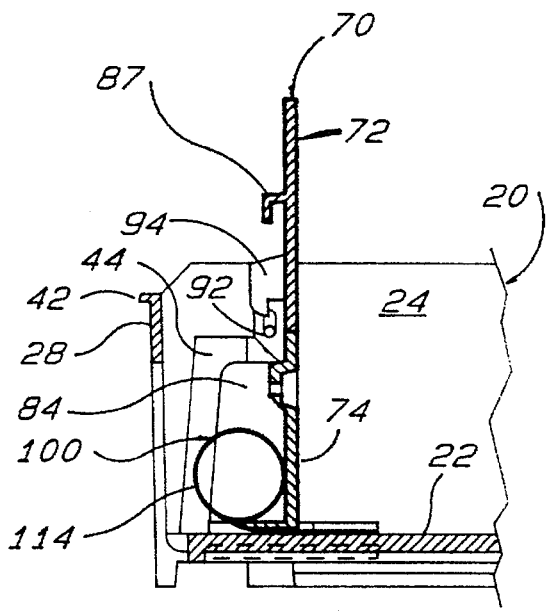
FIG. 8 is a fragmentary vertical cross section of the device, showing the pusher at the rearmost position on the respective track.
Figure 11:
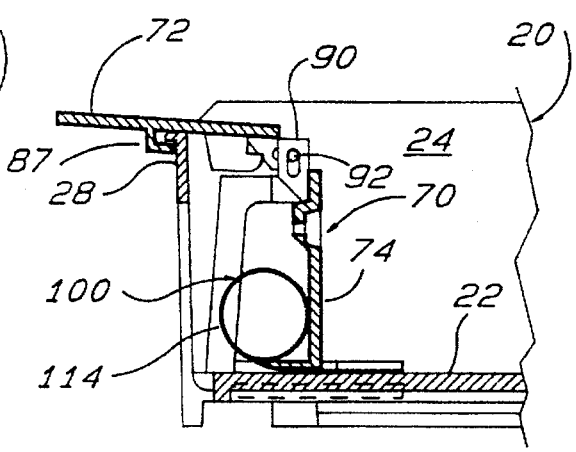
FIG. 11 is a view similar to FIG. 10, showing the pusher in a moored condition wherein the upper member is engaged at its hook with the rear wall of the track.

The hinge 76 permits the upper member 72 to selectively pivot from an upright pushing position as shown in FIG. 8 to a generally horizontal loading position as shown in FIG. 11 and vice versa. When in the pushing position, the upper member 72 is disposed upright and forms the flat front side of the respective pusher 70 in cooperation with the lower member 74, which front side is adapted to engage the rearmost article on the respective track. This position is maintained in part by the contact between the forward surfaces of the upper knuckles 88 and the rear surface of the plate portion 78 of the lower member 74 and in part by the contact between the forward surfaces of the lower knuckles 90 and the rear surface of the upper member 72. The pushing position is further maintained by locking clips 94 integrally formed on the upper member 72, which clips 94 brace against the lower knuckles 90 when the upper member 72 is in the pushing position.

Figure 10:
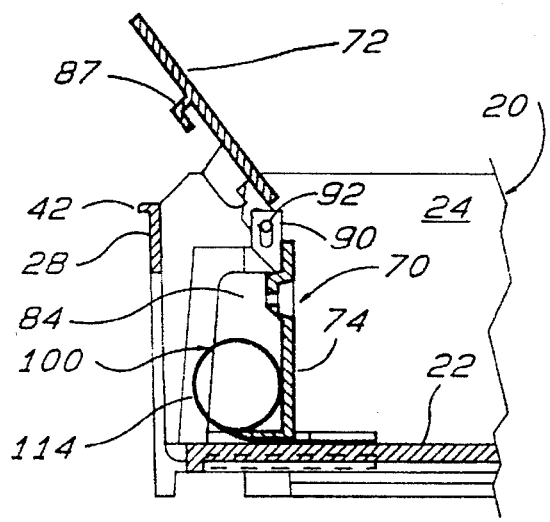
FIG. 10 is a view similar to FIG. 9, showing the upper member of the pusher in the process of being pivoted backwards.
Figure 9:
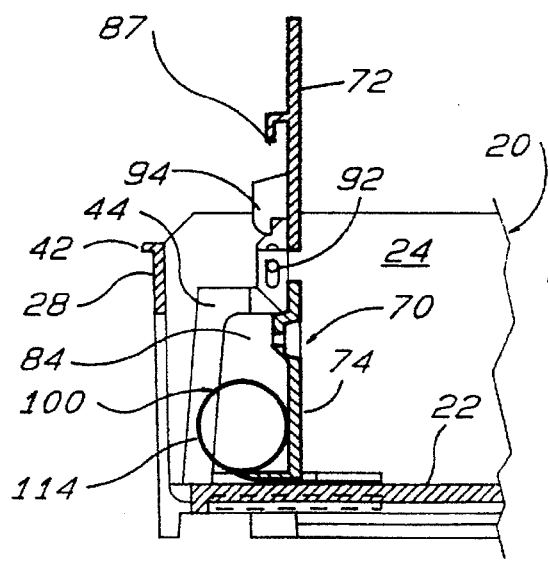
FIG. 9 is a view similar to FIG. 8, showing the upper member of the pusher displaced upward in order for the mooring process to be initiated.

The upper member 72 can be pivoted from the pushing position to the loading position by displacing the upper member 72 upward, as shown in FIG. 9, to disengage the contact points of the knuckles 88 and 90 as well as the bracing points of the clips 94, and then pivoting the upper member 72 downward and backward of the track 20 as shown in FIG. 10. When arriving at the loading position of FIG. 11, the upper member 72 extends generally horizontally toward the rear wall 28 of the respective track 20. This permits the mooring hook 87 to engage the retaining rib 42 once the pusher 70 is brought to the rearmost position on the track 20 as shown in FIGS. 8–11. The rearmost position is a location in which the pusher 70 is close enough to the rear wall 28 to allow the hook 87 to reach the rear wall 28. The engagement of the hook 87 with the rear wall 28 retains the pusher 70 at the rearmost position against the force of the respective spring 100 without need of using human hand, which facilitates loading or reloading of articles C onto that portion of the respective track 20 between the pusher 70 and the front wall 26. In addition, the upper member 72 lowered to the loading position can provide additional space between the respective track 20 and a display shelf which could be located above the track 20. Such space also facilitates loading of articles when the track 20 is back-loaded in particular.

The hinge 76 also permits the upper member 72 to be pivoted toward the front wall 26 to add versatility.

The springs 100 are self-coiling springs each formed of a strip of spring material. Each spring 100 is secured at its forward end 112 to the respective anchor stud 38, extends backward to the location behind the respective pusher 70 and is wound into a coil at the location between the respective spring retainers 84 and 86. The wound/coiled portion 114 of the spring 100 that is located between the retainers 84 and 86 is best shown in FIGS. 8–11. As it is apparent, when the pusher 70 is at the rearmost position, the spring 100 is most extended and thus forms the coiled portion 114 having a relatively small diameter. On the other hand, as the pusher 70 is moved forward, the extended spring strip is gradually retracted and wound around the coiled portion 114 and thereby the coiled portion 114 is increased in diameter.

Figure 12:
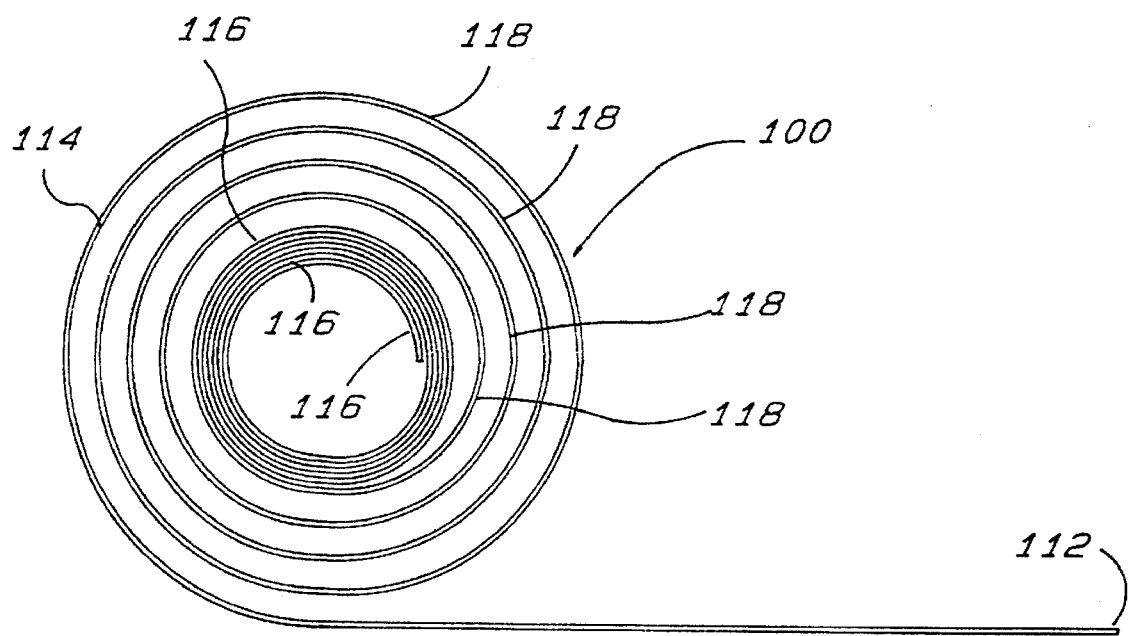
FIG. 12 is an enlarged side elevation of the self-coiling spring in FIG. 2.

FIG. 12 illustrates the spring 100 with the coiled portion 114 that is formed when the pusher 70 is in the foremost position on the respective track 20. In this condition, the coiled portion 114 has a two-stage structure which comprises inner layers 116 of spring strip disposed in substantial contact with each other and outer layers 118 of spring strip substantially spaced from each other radially of the coil axis. This arrangement permits the portion composed of the outer layers 118 to behave as a gradient/variable force spring and yet the portion composed of the inner layers 116 to behave as a constant force spring. The total length of the strip for the outer layers 118 is preferably less than the length of the respective track 20 and, more preferably, equal generally to (N−1) times the outer size of each article (e.g., the diameter of each bottle) used with the present invention, where "N" is the maximum number of the articles which can be accommodated by the respective track 20. In any case, it is preferred to arrange the spring such that at least a portion of the length of the strip for forming the inner layers is extended when the pusher is brought to the rearmost position.

In the above arrangement, the spring 100 exerts forwardly directed force on the rear side of the pusher 70 so as to urge the pusher 70 toward the front wall 26. As a result, when positioned between the pusher 70 and the front wall 26, articles C are driven by the pusher 70 to automatically feed toward the front wall 26 as the leading articles successively are removed from the respective track 20 through the front end of the track 20.

The strength of each spring 100 should be such that it exerts sufficient force throughout the range of movement of the respective pusher 70 to move all the articles between the pusher 70 and the respective front wall 26 until the leading/foremost article on the track 20 reaches to approach the front wall 26. Assuming that each track 20, when fully loaded, accommodates seven articles, the spring 100 should exert sufficient force to move six remaining articles when the leading article is removed from the track 20, to move the five remaining articles when the next leading article is removed, and so on. For this purpose, the spring 100 having the gradient force spring portion is appropriate because the force exerted by the spring 100 gradually reduces as the leading articles successively are removed from the track 20. In other words, the spring 100 is of utility because the articles on the track 20 are prevented from being subject to excessive force. Generally, a gradient force spring when fully extended can exert sufficient force to move more than several heavyweight articles, such as one-liter beverage bottles, on a low friction plastic track, and yet it can exert less force just enough to move smaller numbers of articles when partially retracted.

The spring 100 is also appropriate to prevent excess force from being exerted on the articles when the respective track 20 is fully loaded. This is due to the two-stage structure having the constant force spring portion. As described above, because a device designed to accommodate seven articles does not need to move seven articles but six, the constant force spring portion of the spring 100 can prevent the spring force from being unnecessarily increased to the magnitude which is more than adequate to move six articles.

The force range of the spring 100 may be between 0.01 pound to 100 pound depending upon the kind of articles used with the invention. The preferred force range for bottles and cans may be 0.75 pound to 2 pound, whereas the preferred range for packaged food products may be between 0.01 pound to 100 pound.

Figure 13:
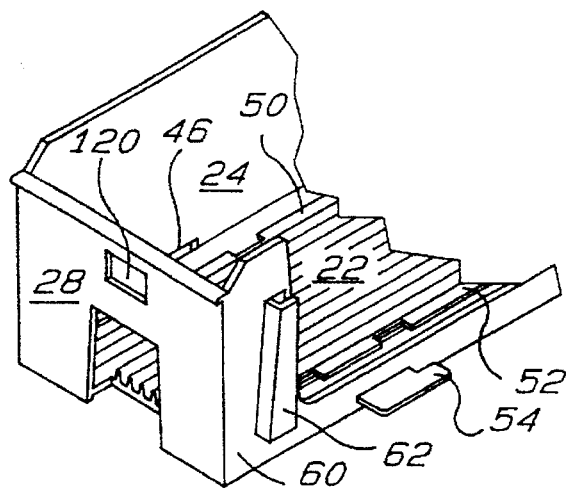
FIG. 13 is an enlarged perspective view of the rear portion of a modified form of the track in FIG. 2.

It will be recognized that many variations may be made to the foregoing embodiment within the scope of the present invention. For example, so called "living hinge" may be used in place of the mechanical hinge 76. Such a living hinge may comprise a strip of plastic material integrally formed with and interposed between the respective upper and lower members 72 and 74. Further, the hinge 76 may be omitted from the pusher 70. In this a case, the hook 87 may be formed of flexible material and molded into a hook-shaped member having an elongated arm portion extending horizontally backwards from the pusher 70. Such a flexible hook can bend upward and downward to engage or release the rear wall 28. Alternatively, the hook 87 may be replaced by an elongate hook arm which is hinged to the pusher 70 for upward and downward pivotal movement. Further, more than one mooring hook may be provided on the rear side of the pusher 70 to assure the structural strength of the mooring means. In addition, the retaining means 42 may be replaced by an aperture or a recess which is formed in the rear wall 28. An example of the retaining means in the form of an aperture is illustrated in FIG. 13 at 120.

It should be also recognized that alternative types of spring may be used with the invention. Such alternative types may include a constant force spring and a stretchable coiled tension spring. An example of the constant force spring may be found by reference to U.S. Pat. No. 4,370,741 whereas an example of the stretchable tension spring may be found by reference to U.S. Pat. Nos. 4,901,869 and 5,111,942 which are incorporated herein by reference.

Figure 14:
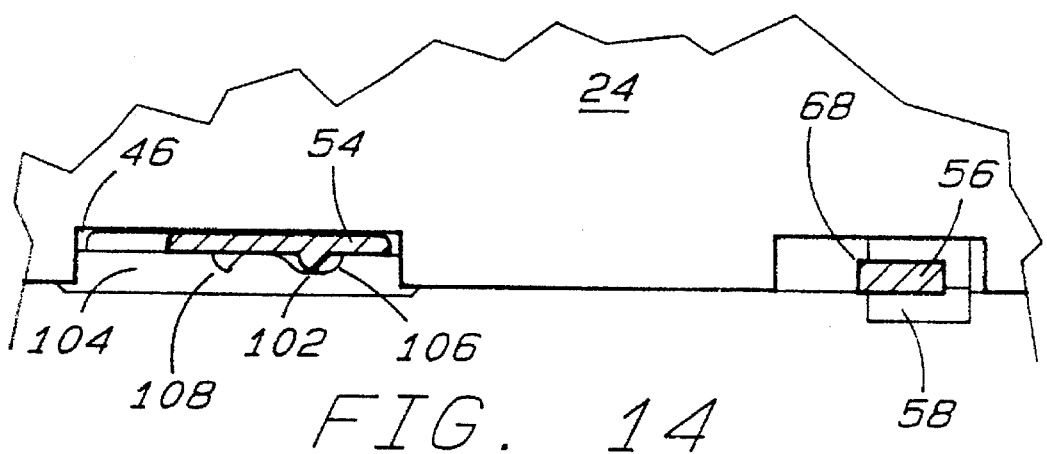
FIG. 14 is a fragmentary view taken along the line XIV—XIV in FIG. 4.
Figure 15:
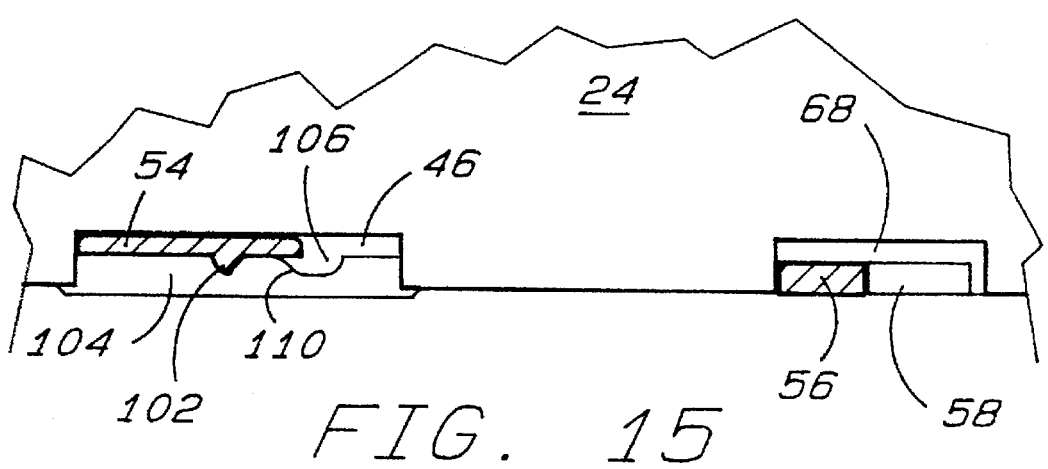
FIG. 15 is a fragmentary view taken along the line XV—XV in FIG. 6.

It should be further recognized that each track 20 may be provided with additional arrangement for retaining two tracks in the interconnected condition. An example of such an arrangement is shown in FIGS. 14 and 15 in which the each connector element 54 is provided on its lower surface with an engaging rib 102 whereas the lower perimeter of each connector slot 46 is defined by an engaging strip 104 joined to the floor 22. The strip 104 has at its upper surface two adjacent notches, i.e., a guide notch 106 and locking notch 108. The guide notch 106 receive the associated engaging rib 102 as shown in FIG. 14 when the respective connector element 54 is first inserted into the associated connector slot 46. On the other hand, the locking notch 108 receives and locks the associated engaging rib 102 therein as shown in FIG. 15 when the respective connector element 54 is brought to the engaged position. The side perimeter of the guide notch 106 may be defined by a sloping wall 110 for smoothly guiding the engaging rib 102 into the locking notch 108.

What is claimed is:

1. An article pusher device comprising:
   an elongate track having a front end and a rear end and including a floor for positioning a row of articles thereon for movement along said track;
   a pusher movably connected to said track for movement along said track and having a front side for engagement with a rearmost article on said track; and
   a self-coiling spring for urging said pusher toward said front end of said track so as to move all articles on said track toward said front end, said spring comprising a strip of spring material wound at least partially to form a coiled portion defining a coil axis, said coiled portion being arranged such that said coiled portion is extended as said pusher is moved toward said rear end of said track, said coiled portion when fully wound comprising an inner set of layers of said strip disposed around said coil axis and an outer set of layers of said strip disposed around said inner set of layers, said layers in said inner set being arranged such that said inner set of layers forms a constant force spring, said layers in said outer set being arranged such that said outer set of layers forms a gradient force spring.

2. The device according to claim 1, wherein said layers of said inner set are disposed in substantial contact with each other, and said layers of said outer set are substantially spaced from each other radially of said coil axis.

3. The device according to claim 1, wherein said spring is arranged such that at least a portion of the length of said strip for forming said inner layers is extended when the pusher is brought to a rearmost position on said track.

4. The device according to claim 1, wherein said strip is secured at one end thereof to said track adjacent to said front end, said strip extending toward said rear end to a location behind said pusher and being wound into said coiled portion at said location, and the total length of a portion of said strip for forming said outer layers is less than the length of said track.

5. An article pusher device comprising:

an elongate track having a front end and a rear wall and including a floor for positioning a row of articles thereon for movement along said track;

a pusher connected to said track for movement therealong and having a front side for engagement with a rearmost article on said track;

spring means for urging said pusher toward said front end of said track so as to move all articles on said track toward said front end; and mooring means for locking said pusher in a rearmost position on said track so as to facilitate loading of articles onto said track between said front end and said pusher, said mooring means being provided on said pusher to engage said rear wall of said track, said mooring means comprising a hook projecting from a rear side of said pusher, wherein said hook is integrally formed with said pusher.

6. An article pusher device comprising:

an elongate track having a front end and a rear wall and including a floor for positioning a row of articles thereon for movement along said track;

a pusher connected to said track for movement therealong and having a front side for engagement with a rearmost article on said track;

spring means for urging said pusher toward said front end of said track so as to move all articles on said track toward said front end; and mooring means for locking said pusher in a rearmost position on said track so as to facilitate loading of articles onto said track between said front end and said pusher, said mooring means being provided on said pusher to engage said rear wall of said track, wherein said track comprises a floor, and said rear wall extends upward from said floor, said rear wall having retaining means for engagement with said mooring means, wherein said mooring means comprises a hook projecting from a rear side of said pusher, and wherein said retaining means is an aperture formed in said rear wall.

7. An article pusher device comprising:

an elongate track having a front end and a rear wall and including a floor for positioning a row of articles thereon for movement along said track;

a pusher connected to said track for movement therealong and having a front side for engagement with a rearmost article on said track;

spring means for urging said pusher toward said front end of said track so as to move all articles on said track toward said front end; and mooring means for locking said pusher in a rearmost position on said track so as to facilitate loading of articles onto said track between said front end and said pusher, said mooring means being provided on said pusher to engage said rear wall of said track, wherein said track comprises a floor, and said rear wall extends upward from said floor, said rear wall having retaining means for engagement with said mooring means, wherein said mooring means comprises a hook projecting from a rear side of said pusher, and wherein said retaining means is a recess formed in a rear surface of said rear wall.

8. An article pusher device comprising:

an elongate track having a front end and a rear wall and including a floor for positioning a row of articles thereon for movement along said track;

a pusher connected to said track for movement therealong and having a front side for engagement with a rearmost article on said track;

spring means for urging said pusher toward said front end of said track so as to move all articles on said track toward said front end; and mooring means for locking said pusher in a rearmost position on said track so as to facilitate loading of articles onto said track between said front end and said pusher, said mooring means being provided on said pusher to engage said rear wall of said track, wherein said pusher comprises an upper member and a lower member pivotally interconnected by hinge means, and said mooring means is provided on said upper member.

9. The device according to claim 8, wherein said lower member is slidably connected to said track for movement therealong, said upper member is pivotable between a pushing position wherein said upper member forms said front side in cooperation with said lower member and a loading position wherein said upper member extends from said lower member generally toward said rear wall, and said mooring means is engageable with said rear wall when said upper member is in said loading position.

10. The device according to claim 9, wherein said pusher comprises means for locking said upper member in said pushing position.

11. The device according to claim 5, wherein said rear wall has retaining means for engagement with said mooring means, said retaining means comprising a rib formed on a rear surface of said rear wall.

12. The device according to claim 8, wherein said rear wall has retaining means for engagement with said mooring means, said retaining means comprising a rib formed on a rear surface of said rear wall.

* * * * *